US008250620B1

(12) United States Patent
Basso et al.

(10) Patent No.: US 8,250,620 B1
(45) Date of Patent: Aug. 21, 2012

(54) SYSTEM AND METHOD FOR SHARING INFORMATION BETWEEN A CONCIERGE AND GUEST

(75) Inventors: Andrea Basso, Ocean, NJ (US); Steven Lloyd Greenspan, Scotch Plains, NJ (US); David M. Weimer, Aberdeen, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1805 days.

(21) Appl. No.: 09/955,369

(22) Filed: Sep. 18, 2001

Related U.S. Application Data (63) Continuation-in-part of application No. 09/223,161, filed on Dec. 30, 1998, now Pat. No. 6,425,131.

(51) Int. Cl.
*H04N 7/173* (2011.01)

(52) U.S. Cl. ............ 725/131; 725/25; 725/78; 725/109; 725/151

(58) Field of Classification Search .................... 725/74, 725/78, 80, 82, 83, 85, 117, 25, 109, 110, 725/112, 113, 131, 134, 139, 142, 151; 709/218–225
See application file for complete search history.

(56) References Cited

U.S. PATENT DOCUMENTS

| | | | |
|---|---|---|---|
| 4,763,191 A | | 8/1988 | Gordon et al. |
| 5,077,607 A * | | 12/1991 | Johnson et al. .................. 725/74 |
| 5,278,889 A | | 1/1994 | Papanicolaou et al. |
| 5,473,679 A | | 12/1995 | La Porta et al. |
| 5,539,449 A | | 7/1996 | Blahut et al. |
| 5,612,730 A * | | 3/1997 | Lewis ............................. 725/83 |
| 5,661,517 A * | | 8/1997 | Budow et al. .................. 725/60 |
| 5,838,682 A | | 11/1998 | Dekelbaum et al. |
| 5,907,598 A | | 5/1999 | Mandalia et al. |
| 5,990,885 A * | | 11/1999 | Gopinath ........................ 715/716 |
| 5,999,612 A | | 12/1999 | Dunn et al. |
| 6,028,860 A | | 2/2000 | Laubach et al. |
| 6,055,512 A * | | 4/2000 | Dean et al. .................... 709/218 |
| 6,144,991 A * | | 11/2000 | England ........................ 709/205 |
| 6,167,443 A * | | 12/2000 | Decker et al. .................. 725/78 |

(Continued)

FOREIGN PATENT DOCUMENTS
EP   0 709 997   5/1996
(Continued)

OTHER PUBLICATIONS http://www.ictv.com/overview.html Interactive Cable Television—Product overview, architecture, data sheets, specification (Nov. 17, 1998).

(Continued)

*Primary Examiner* — Farzana Hossain (57) ABSTRACT

A novel mechanism is disclosed by which a sender can direct information such as an audiovisual signal to a particular recipient's audiovisual display device, such as a cable television set and, thereby, share information between the sender and the recipient. In one embodiment of the invention, a calling party originates a telephone call and associates that telephone call with audio-visual information that exists on the caller's personal computer or on an Internet server. The called party answers the call, and can tune an associated cable television to the appropriate channel in order to view the audio-visual information. In another embodiment, the caller is a hotel guest and the called party is a hotel concierge and vice versa. The concierge provides information to the hotel guest such that the hotel guest can tune in to a channel on their hotel television set and access the information.

19 Claims, 5 Drawing Sheets

U.S. PATENT DOCUMENTS

| | | | |
|---|---|---|---|
| 6,226,618 B1 * | 5/2001 | Downs et al. | 705/51 |
| 6,314,165 B1 * | 11/2001 | Junqua et al. | 379/88.03 |
| 6,377,664 B2 | 4/2002 | Gerszberg et al. | |
| 6,425,131 B2 * | 7/2002 | Crandall et al. | 725/106 |
| 6,567,981 B1 | 5/2003 | Jeffrey | |
| 6,622,304 B1 | 9/2003 | Carhart | |
| 6,636,894 B1 * | 10/2003 | Short et al. | 709/225 |
| 6,714,536 B1 | 3/2004 | Dowling | |
| 6,868,399 B1 * | 3/2005 | Short et al. | 709/224 |
| 2002/0073430 A1 * | 6/2002 | Crandall et al. | 725/105 |
| 2005/0165719 A1 * | 7/2005 | Greenspan et al. | 707/1 |
| 2005/0262542 A1 * | 11/2005 | DeWeese et al. | 725/106 |
| 2006/0215029 A1 | 9/2006 | Katz | |

FOREIGN PATENT DOCUMENTS

| | | |
|---|---|---|
| GB | 2341 038 A | 3/2000 |
| WO | WO 9747119 A1 * | 12/1997 |

OTHER PUBLICATIONS

"Comcast and Natwest test mortgage advice on TV", Advanced Television Markets, 95/02/00, p. 14.

* cited by examiner

SYSTEM AND METHOD FOR SHARING INFORMATION BETWEEN A CONCIERGE AND GUEST

This is a continuation in part of U.S. application Ser. No. 09/223,161 filed Dec. 30, 1998 now U.S. Pat. No. 6,425,131 entitled METHOD AND APPARATUS FOR INTERNET CO-BROWSING OVER CABLE TELEVISION AND CONTROLLED THROUGH COMPUTER TELEPHONY.

BACKGROUND OF THE INVENTION

The present invention relates to television systems and computer systems and, more particularly, to systems and methods for sharing information between the two, and even more particularly, to systems and method for sharing information between a concierge and one or more recipients in either a permanent or temporary residential setting.

With the pervasive presence of voice communication devices, there is also a common need to share visual information as well. Many consumers have expressed the need to share family photographs with others, as is evidenced in part by the rapid adoption of digitized photography and photo album software. Likewise, many customers find voice-only interactions with businesses wanting, as evidenced in part by the rapid growth in visually-oriented web-based customer support. An early alternative to voice telephony has been video telephony. Video telephony allows telephone calls in which both caller and calling party can see each other via a visual display. The visual display and camera needed at each end of the call might be attached to the phone, to a PC, or to a television. The slow adoption of this form of communication is partly due to the need co-diffusion of the technology (i.e. both parties need similar equipment), the expense and difficulty of managing the technology, and the lack of interest by many consumers.

The rapid development of the World Wide Web and the Internet has provided alternative avenues of sharing information. For example, IP (Internet Protocol) cobrowsing is a process that allows users to control web browsing on their personal computers (PCs) and on PCs operated by other PC users. Thus, the uniform resource locator (URL) displayed in one browser is also displayed on another browser. Depending on the application, control might be symmetric (shared by both users) or asymmetric (controlled by only one user). Other collaborative PC applications allow multiple users to simultaneously control the viewing and editing of the same document. In order to use the above methods of sharing web browsing and other applications, however, both users are obviously required to have access to a PC. Most households in the U.S. do not have PCs. PCs currently have a market penetration of roughly forty percent of U.S. households, and far fewer use such PCs for web browsing (though they may use the Internet from work).

On the other hand, approximately 65% of U.S. households subscribe to cable television and cable networks can be easily accessed by over 90% of U.S. households. Methods currently exist that allow a television set to be used as a web browser to access the Internet, e.g. WebTV. Such arrangements, however, rely on upstream data paths either through a cable or telephone connection. Navigating the World Wide Web requires a separate keyboard or a specialized remote control. Moreover, the set top box required for such arrangements tends to be costly and also tends to be difficult to use by people who are not familiar with web browsers and URLs. Accordingly, there are many people who would benefit from the ability to see certain web sites occasionally without requiring the need to browse on a regular basis. One example of such a person would be a cable TV viewer who occasionally desires information from a site such as Pointcast but otherwise is not interested in web browsing or computer use. Another example is a personal computer user who desires to send a graphic image to a person who has access to only a cable TV, e.g. a PC-enabled family who wants to send a picture of a newborn baby while simultaneously talking to the far-away grandparents who only have access to cable TV and a telephone line.

The discussion above suggests three recent market trends that are relevant as background to the current invention: (1) the slow growth of video telephony and WebTV; (2) the development and growth of Internet-based cobrowsing techniques; and (3) the rapid growth of methods that allow consumers to create digitized photographs, store them in a personal computer, and share them via the Internet with close friends and relatives. Accordingly, given these three market trends, it would be advantageous to devise a novel mechanism for directing data (such as an audiovisual signal) across a data network (such as the Internet) to a particular cable TV.

Such a novel mechanism for directing data across a data network to a particular cable TV would be very desirable in certain applications, such as for example, in a centralized concierge application, where a central concierge may serve a number of clients from a single location. The concierge may provide personalized services via this novel mechanism such as information about, for example, travel arrangements, restaurant reservations, recreation activities and any number of client request. In such an example, the central concierge may serve the needs of any number of clients, such as hotel guests, condominium residents, etc. without regard to whether the concierge and the clients were located in physical proximity to one another.

SUMMARY OF THE INVENTION

The present invention presents a novel mechanism by which a sender can direct information such as an audiovisual signal to a particular recipient's audiovisual display device, such as a cable television set and, thereby, share information between the sender and the recipient. In one embodiment of the invention, the calling party originates a connection on a voice communication network, e.g. a telephone call, and associates that telephone call with audio-visual information that exists on the caller's computer or on an Internet server. The called party answers the call, and can tune an associated cable television to the appropriate channel in order to view the audio-visual information. The caller can modify the audio-visual information during the call. Accordingly, the current invention ties together the telephone, cable, and IP networks in a manner that does not require large investments from cable or telephone service providers beyond what is already being invested to support Internet-access with cable.

The key concept is the association between two otherwise independent channels of information: one used for multi-way voice and the other for data. Information in the setup instructions for the multi-way voice-enabled channel is used to address the recipients of data (who are also participants in the voice conversation) and in-band signaling or an implicit criteria such as duration of the conversation is used to grant permission to receive data over the data channel. Notably, the conversation can continue while the data is being transmitted.

In an alternative embodiment of the invention, a called party, such as a representative at a customer service center or an interactive voice response unit, can associate audio-visual information with the call such that the calling party can see the data on the appropriate television channel. In another embodiment, the telephone keypad can be used to move forwards and backwards through a series of audio-visual screens. In another embodiment, the cable subscriber can preset the television to a particular URL which can be viewed, but not navigated, without the telephone call.

In another embodiment of the invention, a telephone connection is established between a client, such as a guest in a hotel, or similarly, a resident in a condominium or apartment building and a concierge. The call may be originated by either the guest/resident or the concierge. The concierge may provide certain audio-visual information or content to the guest's/resident's display device, such as their in-room cable television which can then be accessed by the guest/resident.

These and other aspects of the invention will become apparent from the drawings and the detailed description.

DETAILED DESCRIPTION

Figure 1:
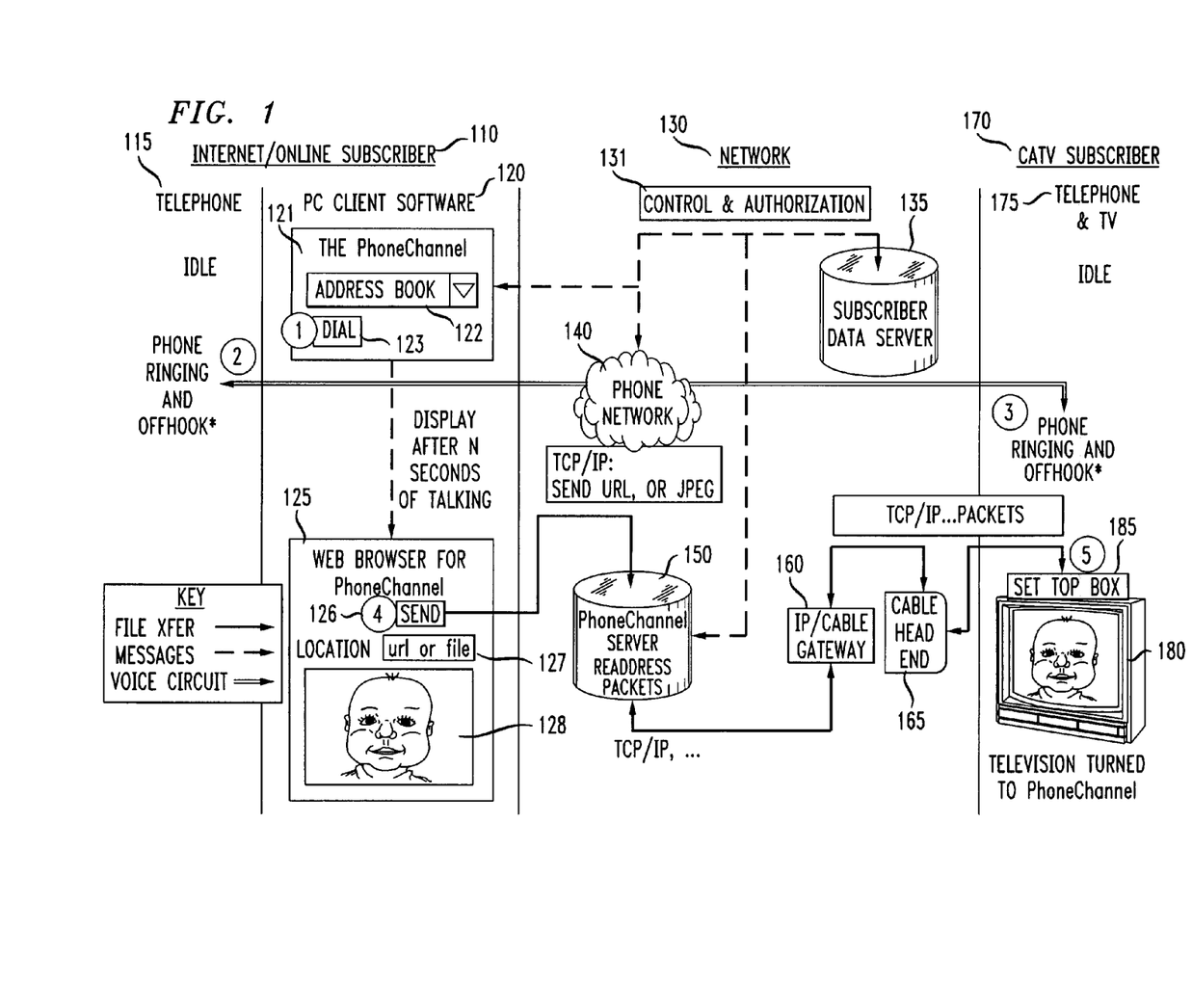
FIG. 1 is an overall block diagram of a integrated telephony/data/television system configured in accordance with an embodiment of the invention.

A preferred embodiment of the present invention is disclosed in the block diagram of FIG. 1. An Internet/online subscriber 110 with access to a "control" computer executing client software 120 and a telephone 115 wishes to communicate with a recipient who is a community access television (CATV) subscriber 170 and who also has a telephone 175. An integrated telephony/data/television network 130 connects the sender to the recipient. Known security and encryption mechanisms can be incorporated into the signaling protocols used to implement the present invention.

The control computer (which may be a personal computer or an automated interactive server of some kind) may be connected to a data network, which for purposes of illustration is a connectionless packet-switched public data network (PDN) such as the Internet. The sender's control computer is connected across the data network to a server computer 150 which facilitates the broadcast of the information to the recipient. The client software 120 illustrated in FIG. 1 comprises a computer program 121 which permits the user to choose a recipient from an address book 122 and dial a voice connection to the recipient by selecting button 123. The client software 120 also comprises a computer program 125 that operates like a World Wide Web browser. The user can choose information to be transmitted to the recipient by inputting a file name or URL in field 127. The information is displayed in window 128 and can be transmitted for broadcast by selecting button 126.

The telephones 115, 175 are connected to a voice communication network 140. The telephones can be conventional voice telephone sets with standard local loop connections to nodes within respective local exchange carrier (LEC) networks and between which conventional voice communication paths can be established through an interexchange carrier and/or LEC network. The telephone network may be a conventional connection-oriented telephone network, such as the PSTN, or some other type of network such as an IP-based network. Accordingly, the voice communication network can be separate from the data network, or can be a part of the data network. Regardless, control and authorization signal pathways 131 connect the networks and provide access to a database of subscriber information 135 which includes information regarding the recipient.

The recipient of the shared data 170 may be a CATV subscriber with a conventional television set 180 connected to some coaxial cable distribution network. In FIG. 1, the television 180 is shown connected through a set top box 185 to a cable head end 165 of the cable distribution network. The cable network can be one-way (only a down stream broadcast path) or two-way cable (with a return path). A portion of the bandwidth can be reserved for entertainment channels from some downstream entertainment channel source. The cable head end 165 is connected to an IP/cable gateway 160 which provides access to the data network. The cable head end and the interface unit can be physically located in the same or different locations. The digital signals from the Internet are transformed into whatever type of signal utilized by the television 180 for display, e.g. the standard analog NTSC-modulated RF carrier, an MPEG-compressed digital data stream, or any other format. Regardless of form, specific television channels can be allocated to the present invention or the spectrum devoted to IP communication can be used.

The system permits the control computer to be used to (a) set up a telephone call among two or more telephone sets, and (b) for the duration of the telephone call, display audio-visual material on the cable televisions owned by the called parties. In one embodiment of the invention, the information sent to a particular channel of the CATV subscriber's television is a reformatted version of the content of a URL on the Internet/Cable server and associated with the subscriber's telephone number. Similarly, a direct data channel can be provided between the IP gateway and the Internet-enabled cable head end so that a computer attached to the Internet could directly send audio-visual signals to a cable television using the Internet Protocol without necessarily using HTML. Known software techniques for screen sharing can be used to implement such a system.

Figure 3:
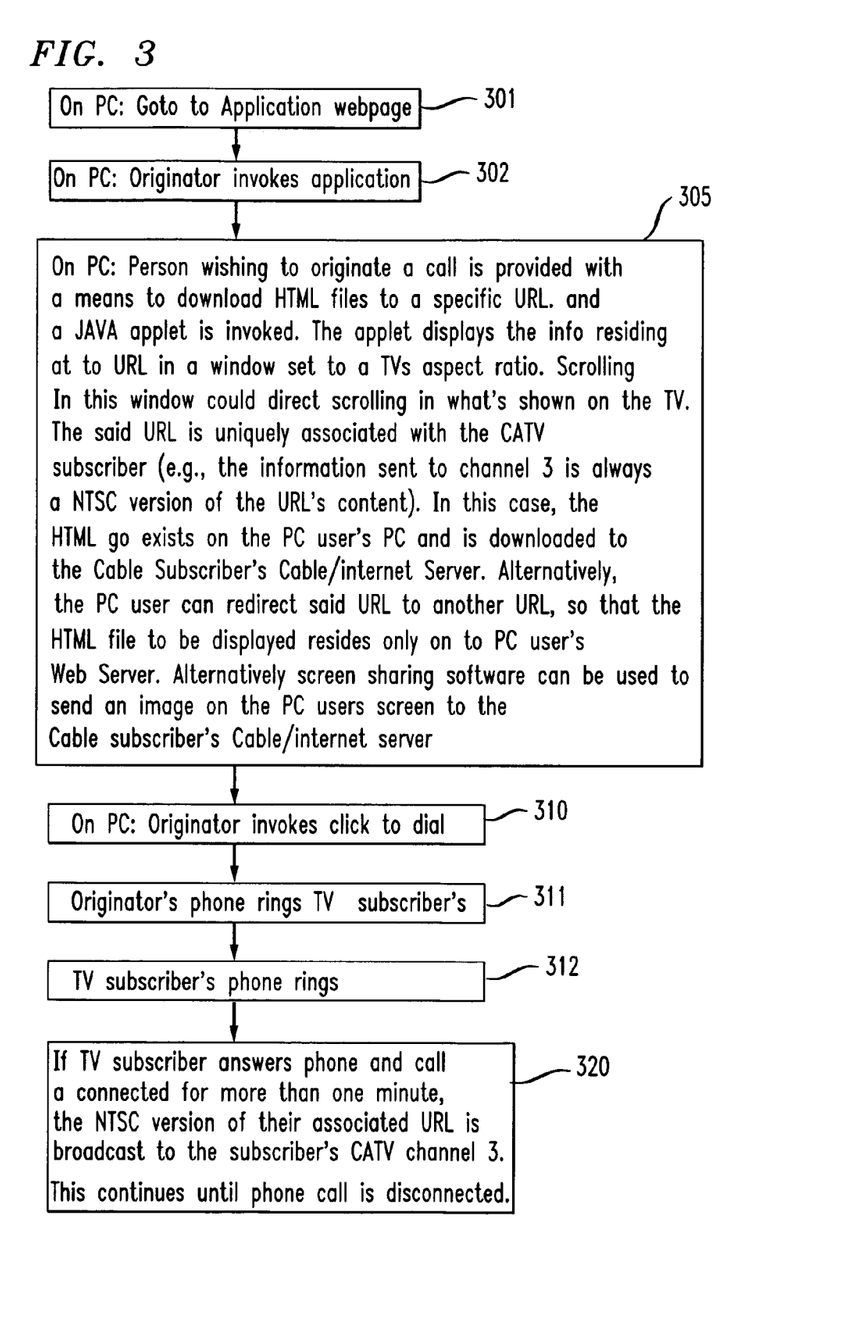
FIG. 3 is a flowchart setting forth the sequence of steps implementing one of the methods disclosed of sending an audiovisual HTML document to a cable television associated with a telephone number.

With reference to FIG. 3, a flowchart is shown which sets forth a sequence of steps implementing one of the methods disclosed of sending an audiovisual HTML document to a cable television associated with a telephone number. The steps disclosed are merely exemplary and are not meant to limit the nature of the invention. At step 301, a computer user, utilizing a conventional Internet browser, first accesses a webpage dedicated to the instant application. At step 302, the user invokes the application, which may provide some login process to confirm identity.

At step 305, the user wishing to send the audiovisual HTML document to a particular CATV subscriber is provided with a means to download the HTML file to a specific network and subnetwork address, e.g. a URL. This address is uniquely associated with the CATV subscriber, e.g. the information sent to a particular channel of the CATV subscriber's television is an NTSC version of the address's content. An applet written in Java can be invoked that displays the information residing at the URL to the user in a window set to a television's aspect ratio. Scrolling in the window can direct the scrolling of what is displayed on the television. The HTML file, which exists on the user's computer is downloaded to the cable subscriber's cable/internet server. Alternatively, the computer user can be provided with means to redirect the above URL to another URL, so that the HTML file displayed on the CATV subscriber's television resides only on some other Web server. Alternatively, screen sharing software can be utilized to send an image displayed on the user's computer screen to the cable subscriber's cable/internet server. Rather than an image, any other type of data, such as audio-visual material, can be encoded, sent through the Internet (or an intranet) and decoded to be broadcast on the cable subscriber's television.

At step 310, the user can then initiate a telephone call to the CATV subscriber. In a preferred embodiment of the invention, the user utilizes an Internet-based telephonic connection service, such as AT&T's Click-2-Dial. Such a service would permit the user to input the calling number and the destination number, and this information would then be transmitted across the data network to a connection server which would establish a telephonic connection to both the user and the destination. The user's telephone would ring at step 311 and the CATV subscriber's telephone would also ring at step 312. As both parties answer their respective telephones, the connection server bridges the two connections permitting the parties to communicate. The details of such a process are set forth in co-pending commonly-assigned U.S. patent application Ser. No. 09/038,149, to Bennett et al., filed on Mar. 19, 1997.

After the TV subscriber answers the telephone call, a version of the URL formatted for the subscriber's television is broadcast on the designated CATV channel at step 320. As described above, the signal can be any type of signal that may be utilized by a television for video display, regardless of the form, including the standard NTSC-modulated RF carrier, an MPEG-compressed digital data stream, or any other format. The broadcast can commence immediately, after a designated period of telephone connection time (e.g. a minute), after the called party has explicitly accepted the cable transmission (e.g. through touch tone), or after some other condition has been met. Explicit acceptance could be accomplished using the touch-tone keypad on the called party's telephone. The calling and called parties can be permitted to interact with the displayed material: either through the calling party's computer or through the use of the touch tone keypad on either the called or calling party's telephone. Thus, the visual display can be altered at the direction of the cable TV viewer via the telephone touch-tone. Scrolling of the CATV image could also be done via the called party's television remote control.

Figure 2:
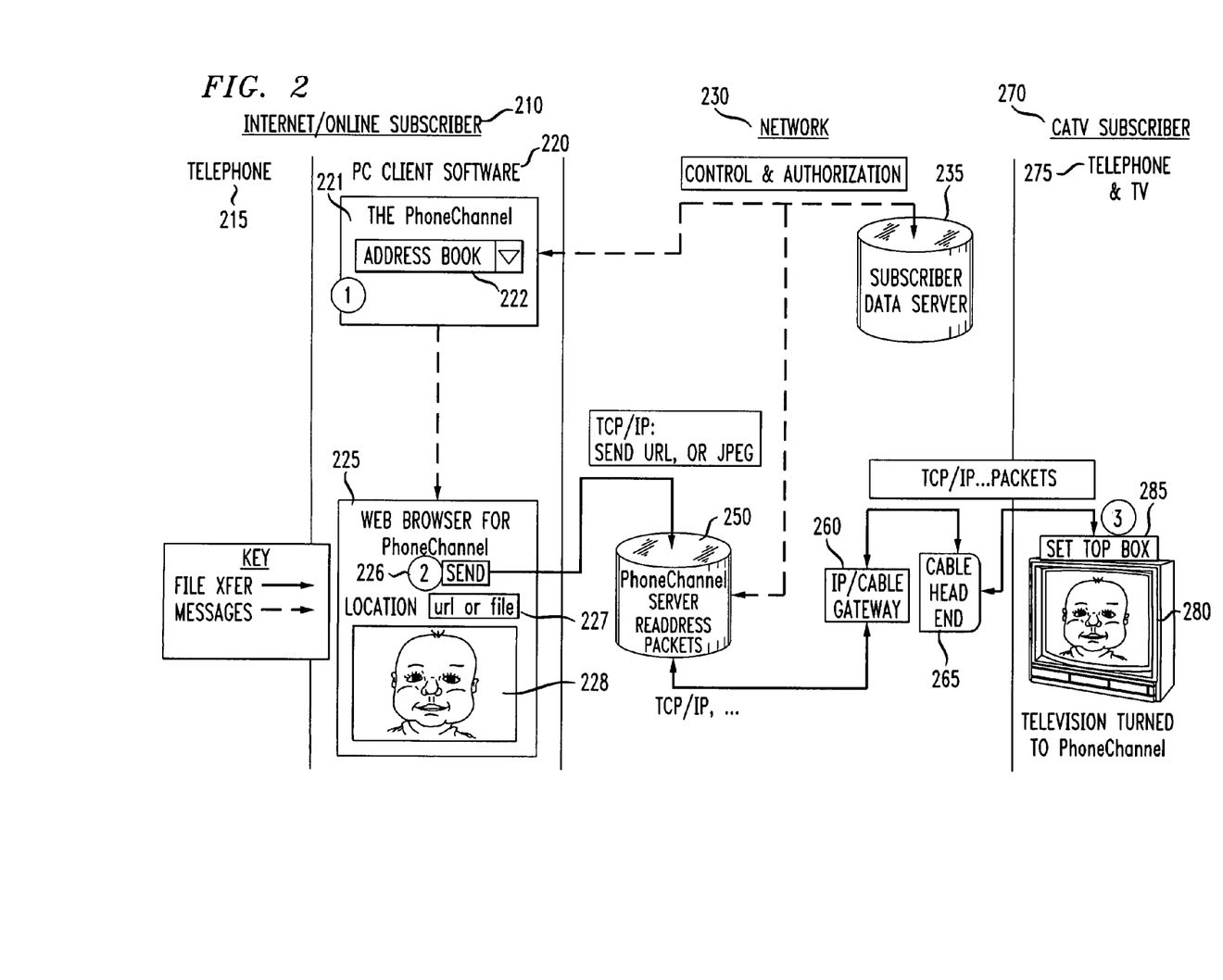
FIG. 2 is an overall block diagram of a integrated telephony/data/television system configured in accordance with another embodiment of the invention.

The broadcast transmission to the subscriber's CATV can continue until the phone call is disconnected. Likewise, the called party can also be allowed to continue viewing the information after the connection with the calling party has disconnected. An example of such a system, after the voice communication connection has ended, is shown in FIG. 2. The called party could continue to interact with the World Wide Web and the web page even after the calling party disconnects, for example, by using the telephone's touch-tone. As shown in FIG. 2, a subscriber 210 with access to telephone 215 and a computer running software 220 communicates via network 230 with CATV subscriber 270 who has access to telephone and television devices 275. Access to the system is controlled via subscriber data server 235. Software 220 includes a computer program 221 with an address book facility 222. Software 220 further includes a browser facility 225 for specifying certain information, such as via software facilities 226, 227 and 228 to provide to subscriber 270. Such information is pushed to server 250 and delivered via gateway 260 and headend 265 to subscriber's set top box 285 which displays the information on display 280.

The figures and the description above refer to cable television, although the concept can be easily generalized to practically any data service such as satellite TV, or MMDS broadcast TV, or even digital radio. Similarly, the concept can be generalized to allow data to be sent to any audiovisual display device, e.g. the receiving party could be using a personal data assistant and could receive the telephone call and then receive the "pushed" data, as described above. For purposes of the present invention, a personal data assistant can be any intelligent consumer device including a personal computer which is manufactured for Internet browsing or for IP reception. The device can be wired or can be equipped for wireless reception from the network.

A second incoming call to the CATV subscriber attempting to present audiovisual information would normally receive a "busy" signal, unless the subscriber has call waiting. In such a case, means can be provided which would cause a synchronized switching between the respective audiovisual materials when the called party switches between the telephone calls. Likewise, a call that is forwarded would also allow the audio-visual information to be forwarded to the cable TV of the receiving household or office. Thus, the above service can be generalized to include CLASS services and their business analogs, e.g. 3-way calling.

The above-mentioned Click-2-Dial permits Internet-based telephonic conference calls. Similarly, each cable subscriber connected using such an audio conference call feature can also, using the above method, be allowed to simultaneously view the displayed information on their cable televisions. Furthermore, the above concept can be generalized to multiple Internet users, so that a calling party can allow a called party to view particular URLs on their own personal computers (not their cable television) during, and only during, a telephone call (unless the image is explicitly saved by the receiving party)—or during and after (but not prior to) the call.

The basic infrastructure that is disclosed could support many other third party applications as well as the above illustrative application. For example, the cable subscriber can originate the call to an interactive voice response system (IVR) and instruct said system to allow viewing of specific audio-visual material through the subscriber's cable television. One example would be if a cable subscriber called directory assistance and used the above method to view telephone directory listings, including related advertisements or information. The directory listings could be residential or commercial; they could represent a selection of those listings most called or received by the subscribing household, or the most recently called or received phone numbers by the subscribing household. The subscriber could select one or several listings and instruct the telephone network to complete a call to the selected telephone numbers.

Therefore, as seen from this example, a request to send information to the cable television of a telephone call participant can be made whether or not the person issuing the request has a computer or other IP-compliant device. Thus, either the calling or called parties can issue a request to send information to the cable TV by using any telephone device, e.g. a mobile phone. Moreover, devices other than computers can be used to send information through the Internet to the designated cable television. For example, a fax machine can send a fax to an internet server which translates the fax image into IP messages. Using the telephone number supplied by the fax machine user, the IP messages are then sent via the Internet to the cable head end associated with that telephone number and, accordingly, to the appropriate cable television.

Provision can be made in the customer premise equipment (CPE) to store the audio-visual information for later recall by the television subscriber, for printing or sending to a fax machine during or after the call, or for forwarding to another television subscriber via the above-described phone call mechanism. The stored audio-visual information can be the actual image, or it can be a URL address of the information. The receiving CPE can also be configured to receive control information from the sender of the information. This control information can be used to restrict the storage of the information at the receiver's premises and thereby protect intellectual property rights. Restrictions could be enforced forbidding the storage of any of the information, permitting only the URL to be stored, permitting only received image to be stored, or permitting the storage for later viewing but forbidding the printing, faxing, or retransmission to another device. Except for industry-wide solutions, there is currently no way to prevent a television subscriber from video-taping the received signal. The communications industry, however, is currently working on devices that restrict the taping of pay-per-view television, and such technology can be adopted in the above invention to further prevent illegal copying.

Figure 4:
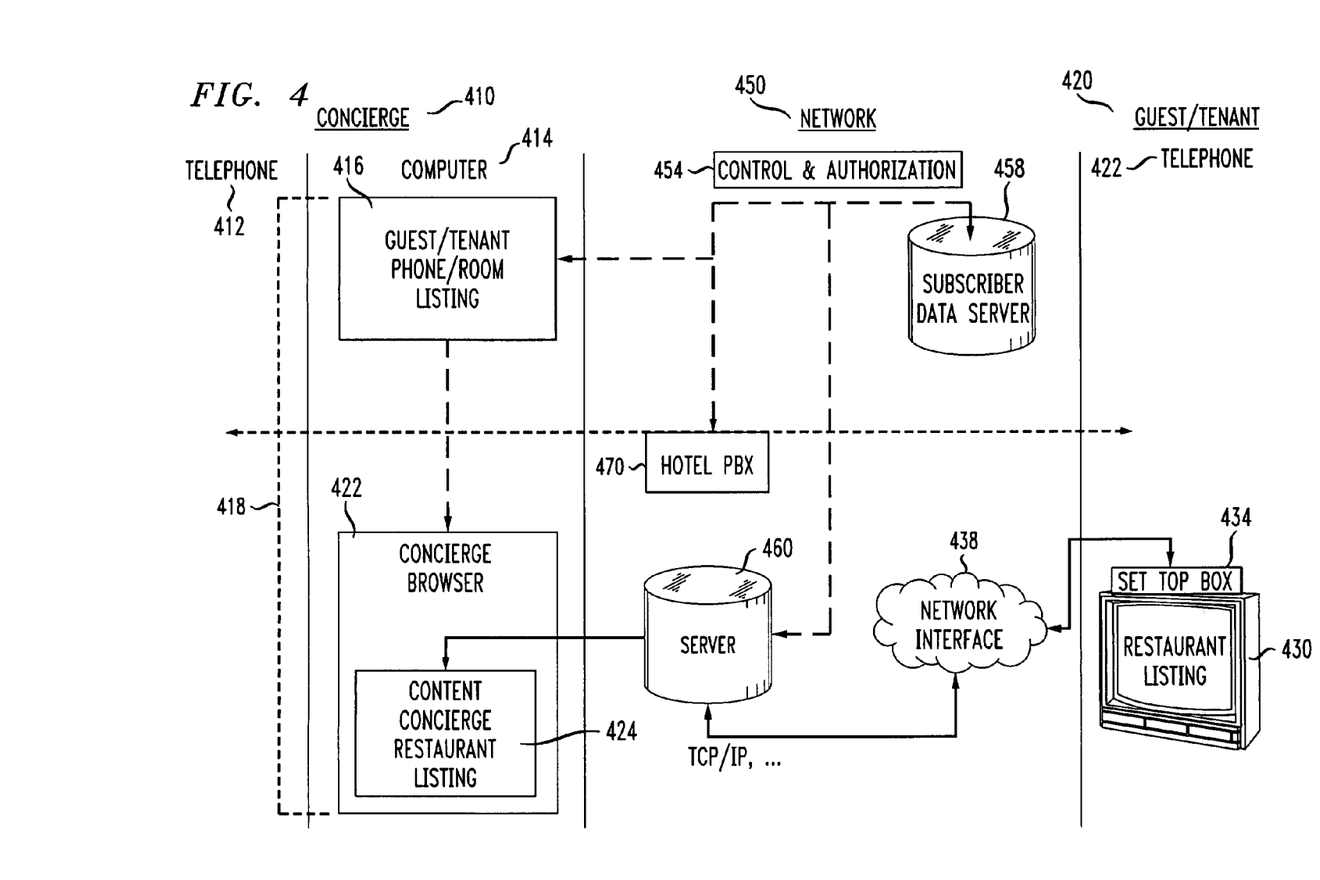
FIG. 4 is an overall block diagram of an integrated telephony/data/television system configured in accordance with yet another embodiment of the invention.

A further embodiment of present invention is shown in FIG. 4. This embodiment is described with reference to a hotel setting but is easily applicable to similar settings such as a condominium, a hospital, an apartment complex and other similar setting. In this embodiment, a number of clients or information recipients, such as hotel guests, tenants or other residents may request and be provided information from the concierge or alternatively, the concierge may unilaterally provide information to the clients. It is contemplated that any number of clients may be serviced by the central concierge. In this exemplary embodiment, one or more of the guests in the hotel may call the concierge number to request information, such as a listing of restaurants, a specific restaurant menu, directions to a specific location, recreational activity information or other information as may be required. Alternatively, the concierge may initiate the call to the guest. Once a communication between the guest and the concierge is established, the concierge is able to push visuals to the guest's television. To access these visuals the guest would tune the television to a specified channel. The concierge could be anywhere in the word, in any time zone and could provide service for multiple hotels. Alternative display devices are possible, e.g. a guest's PC or a broadband phone in the guestroom or lobby.

Referring now to FIG. 4, an exemplary system 400 of an embodiment involving a concierge 410 and at least one client, such as a hotel guest/tenant 420 is shown. In this embodiment, the concierge 410 has access to a telephone 412 and a computer 414 which preferably includes a guest/tenant phone listing 416 which is provided in a software program 418 running on computer 414. In one embodiment, it is contemplated that telephone 412 and computer 414 may be either integrated into a single device or may be provided as separate devices. With telephone 412 and computer 414, concierge 410 is able to communicate with guest/tenant 420 who also has access to a telephone 422 and a television 430. An integrated telephony/data/television network 450 connects the concierge to the guest. Known security and encryption mechanisms can be incorporated into the signaling protocols used to implement the present invention.

In this embodiment, computer 414 (which may be a personal computer or an automated interactive server of some kind) is connected to a data network, which for purposes of illustration is a connectionless packet-switched public data network (PDN) such as the Internet. Computer 414 is connected across the data network to a server computer 460 which facilitates the broadcast of the information to the recipient. Computer 414 runs software 418 which in one embodiment, permits the concierge 410 to choose a recipient from an electronic guest book and dial a voice connection to the recipient. Such software also allows concierge 410 to receive calls and see which guest/tenant may be calling. Such functionality may alternatively be integrated into telephone 412. Client software 418 also provides concierge 410 with the ability to choose information to be transmitted to guest/tenant 420, such as via a browser-like facility 422. Within browser-like facility 422, concierge 410 may view, search, choose and select specific content 424 to be provided to guest/tenant 420. As provide earlier herein, such content may be a listing of restaurants, a specific restaurant menu, directions to a specific location, recreational activity information such as movie or show times and locations and other related information.

Referring again to FIG. 4, in this embodiment, telephones 412 and 422 are connected to a voice communication network, such as a hotel Private Branch Exchange (PBX) 470. PBX 470 may also be provided with standard local loop connections to nodes within respective local exchange carrier (LEC) networks and between which conventional voice communication paths can be established through an interexchange carrier and/or LEC network. The telephone network may also be some other type of network such as an IP-based network. Accordingly, the voice communication network can be separate from the data network, or can be a part of the data network. Regardless, control and authorization signal pathways 454 connect the networks and provide access to a database of subscriber information 458 which includes information regarding the subscribers to the system, such as concierge 410 and guest/tenant 420.

As provided earlier herein, guest/tenant 420 has access to telephone 422 and television 430. In one embodiment, television 430 is connected to some coaxial cable and/or satellite distribution network, such as a hotel cable network. Television 430 is shown connected through an addressable component, such as a set top box 434 to a network interface 438 which may include a cable headend and an IP/cable gateway which provide access to the data network and receives content pushed from server 460.

In the present invention, in order to facilitate communications between parties, it is preferable to have both the concierge and the any number of clients, such as the hotel guests to pre-register with the system, such as through an interface with subscriber data server 458. The registration process may include having registrants provide information such as the location of the phones, and whether or not the associated display device is permitted to send and/or receive visuals which is recorded in for example, database 458. In the present invention, the display used by the concierge is always permitted to send, and typically the guest's display is only permitted to receive content. Thus, when a call is made to or from a hotel telephone that subscribes to the service, such as telephone 422, hotel PBX 470 sends a message via the Internet to a server, such as server 460, that, for example, guest/tenant 420 has called concierge 410. At the same time, PBX 470 forwards the call to an available concierge, such as concierge 410. As long as the call is active, the concierge can "push" visuals to the guest's device, such as television 430.

In an alternative embodiment, the concierge can also push visuals when the guest and concierge are not actually talking via the telephone, provided concierge is registered with the system and authorized to perform such an activity. To do so when no call is active, the concierge enters a hotel code and guest room, such as through software 418 provided on computer 414 or alternatively, through an Interactive Voice Response Unit provided through telephone 412 to establish a connection to guest/tenant 420. In the preferred implementation, the concierge can also change the default image shown on the designated television channel on guest/tenant's television 430. To see the visuals on the guest TV, the guest can tune to a designated channel or navigate to the designated channel using the television's remote control. If the guest and concierge are not talking, the image shown on the designated channel is a default image which may be customized for the guest. If they are talking, the image is either the default or the last pushed image.

In this embodiment, the image pushed by the concierge to the guest's display can be archived and reviewed by the guest at a latter time. This review may be accomplished using standard ITV technology. Finally, when a guest checks out of the hotel, the archive and any customized images will no longer be accessible from the guest room television. Notably, since the service is distributed and not necessarily local to the hotel, the visuals sent to the guest could be forwarded to another hotel or the guest's home or office, or accessed by the guest from another hotel.

Figure 5:
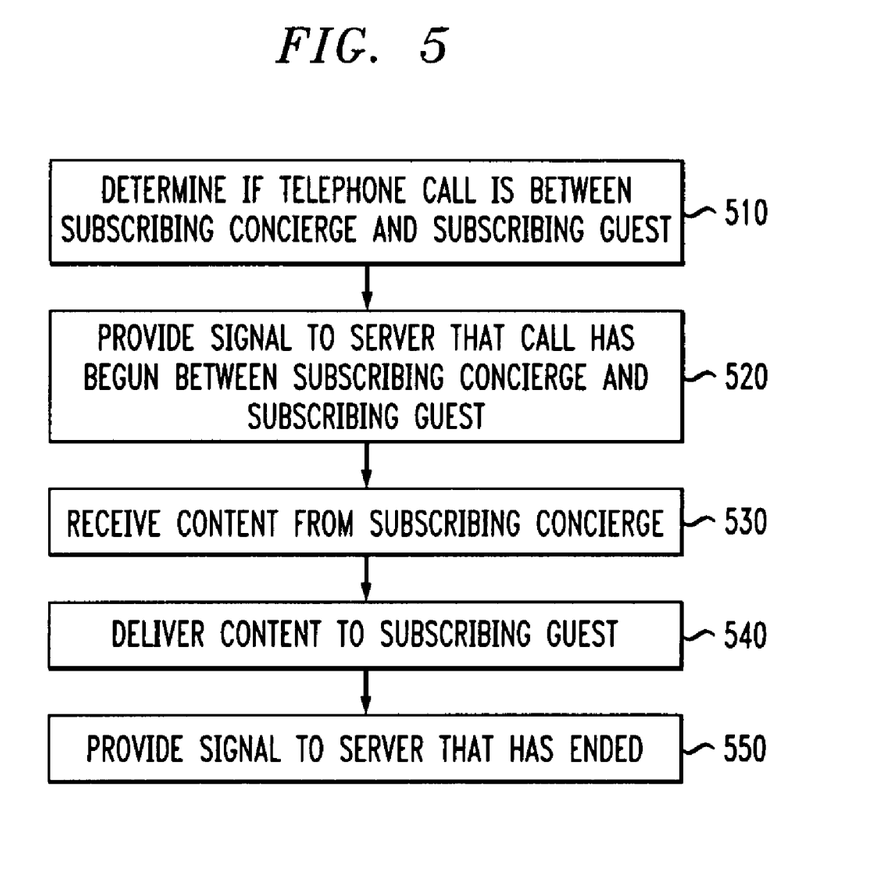
FIG. 5 illustrates an embodiment of the present inventive method.

Referring to FIG. 5, an exemplary method of the present invention is shown. In this embodiment, a call is initiated by a party, such as a concierge or guest and the system determines if the telephone call is between subscribers, step 510. If so, a signal is provided to the server that a call has begun between a subscribing concierge and a subscribing guest, step 520. Content is received from the subscribing concierge, step 530. The received content is delivered, i.e. "pushed" to the subscribing guest, step 540. Once either party terminates the call, a signal is provided to the server that the call has ended, step 550.

It is contemplated that the information recipients or guests may sometimes want a hardcopy of the visual shown on a display device or other related materials. If the concierge is not resident in the hotel, the concierge can push the visual or associated visuals to a fax machine in the guest's room or in the lobby. Additional material might be maintained in the hotel lobby and retrieved by a hotel clerk upon receiving a message from the concierge.

It is to be understood that the above embodiments and their variations are not mutually exclusive but can be combined in various ways to provide a service offering for a subscriber customer. Moreover, variations and modifications to the above-described preferred embodiment will be apparent to one skilled in the art that are also within the spirit and scope of the invention as set forth in the claims below.

What is claimed is:

1. A method for sharing information between a concierge with access to a data network and a recipient's display device, the method comprising:
    registering the concierge and a recipient to share information;
    establishing a voice connection between the concierge and the recipient;
    associating the voice connection with information to be sent across the data network to the recipient's display device;
    initiating a broadcast of the information to the recipient's display device;
    providing a default image to the recipient's display device;
    allowing the recipient to view audio-visual information based on content of a particular URL on the display device, only in response to establishing a voice connection between the concierge and the recipient;
    forwarding control information and the audio-visual information to customer premise equipment for storage to allow the recipient to view the stored audio-visual information on the display device after termination of the voice connection in accordance with the control information, the control information defining usage restrictions related to the audio-visual information forbidding printing and faxing and allowing retransmission of the audio-visual information by the recipient to another recipient; and
    automatically clearing the default image after a predetermined time associated with the recipient.

2. The method of claim 1, wherein establishing the voice connection comprises:
    providing a signal that a voice connection between the concierge and the recipient is being established.

3. The method of claim 2, further comprising:
    terminating the voice connection between the concierge and the recipient by providing a second termination signal.

4. The method of claim 1, wherein the concierge initiates the establishing of the voice connection on a voice communication network.

5. The method of claim 1, wherein the recipient is a hotel guest.

6. The method of claim 5, wherein the predetermined time is when the guest checks out of the hotel.

7. The method of claim 1, wherein the concierge is a hotel concierge.

8. The method of claim 7, wherein the hotel concierge establishes a voice connection to the recipient by using a hotel code and a room number of the recipient.

9. The method of claim 1, wherein the display device is a hotel room television set.

10. A method for providing information from a concierge to a guest recipient via a plurality of modes of communication, the method comprising:
    registering the concierge and the guest recipient for sharing of content over the plurality of modes of communication;
    linking the concierge and the guest recipient together over a first mode of communication;
    receiving content from the concierge via a second mode of communication;
    providing content to the guest recipient over a third mode of communication;
    providing a default image to the guest recipient;
    allowing the guest recipient to view audio-visual information based on content of a particular URL on a display device only in response to linking the concierge and the guest recipient together over the first mode of communication;
    forwarding control information and the audio-visual information to customer premise equipment for storage to allow the guest recipient to view the stored audio-visual information on the display device after termination of the link over the first mode of communication in accordance with the control information, the control information defining usage restrictions related to the audio-visual information forbidding printing and faxing and allowing retransmission of the audio-visual information by the recipient to another recipient; and
    automatically clearing the default image after a predetermined time associated with the guest recipient.

11. The method of claim 10, wherein the first mode of communication is a private branch exchange system, the second mode of communication is a distributed information network and the third mode of communication is a cable television system.

12. The method of claim 10, wherein the content is related to a request received from the guest recipient.

13. The method of claim 10, wherein the concierge initiates the link between the concierge and the guest recipient.

14. A method for sharing information between an information provider and an information recipient who initially communicate via a first communication system, the information recipient having a cable based display device for viewing information from the information provider, the method comprising:

receiving content from the information provider designated for the information recipient;

providing the content from the information provider designated for the information recipient, wherein the content is provided initially by a second communication system and then provided via a third communication system to the information recipient's cable based display device;

providing a default image to the information recipient;

allowing the information recipient to view audio-visual information based on content of a particular URL on the display device, only in response to the information provider and the information recipient communicating via the first communication system;

forwarding control information and the audio-visual information to customer premise equipment for storage to allow the information recipient to view the stored audio-visual information on the display device after termination of communication via the first communication system in accordance with the control information, the control information defining usage restrictions related to the audio-visual information forbidding printing and faxing and allowing retransmission of the audio-visual information by the recipient to another recipient; and automatically clearing the default image after a predetermined time associated with the information recipient.

15. The method of claim 14, wherein the information provider is a hotel concierge.

16. The method of claim 15, wherein the information recipient is a hotel guest.

17. The method of claim 16, wherein the concierge calls the hotel guest via a hotel PBX system.

18. The method of claim 16, wherein the hotel guest calls the concierge via a hotel PBX system.

19. The method of claim 14, further comprising:

providing a hardcopy of the content to the information recipient.

* * * * *